(12) United States Patent
Gehret, Jr.

(10) Patent No.: US 7,239,034 B2
(45) Date of Patent: Jul. 3, 2007

(54) ENGINE DRIVEN POWER INVERTER SYSTEM WITH COGENERATION

(75) Inventor: Joseph B. Gehret, Jr., Lynnfield, MA (US)

(73) Assignee: Tecogen, Inc., Waltham, MA (US)

( * ) Notice: Subject to any disclaimer, the term of this patent is extended or adjusted under 35 U.S.C. 154(b) by 114 days.

(21) Appl. No.: 11/078,191

(22) Filed: Mar. 11, 2005

(65) Prior Publication Data
US 2005/0206167 A1   Sep. 22, 2005

Related U.S. Application Data

(60) Provisional application No. 60/554,031, filed on Mar. 16, 2004, provisional application No. 60/554,063, filed on Mar. 16, 2004, provisional application No. 60/554,026, filed on Mar. 17, 2004, provisional application No. 60/553,737, filed on Mar. 17, 2004, provisional application No. 60/553,810, filed on Mar. 17, 2004.

(51) Int. Cl.
| | |
|---|---|
| *H02P 9/04* | (2006.01) |
| *H02P 9/00* | (2006.01) |
| *F02N 11/06* | (2006.01) |
| *F25B 27/00* | (2006.01) |
| *F02D 29/06* | (2006.01) |

(52) U.S. Cl. ............... 290/40 B; 290/2; 322/24
(58) Field of Classification Search ........... 290/2, 290/40 B; 322/24
See application file for complete search history.

(56) References Cited

U.S. PATENT DOCUMENTS

| | | | | |
|---|---|---|---|---|
| 3,944,837 A | * | 3/1976 | Meyers et al. | ............ 290/40 R |
| 3,955,358 A | * | 5/1976 | Martz et al. | ............ 60/39.182 |
| 3,974,644 A | * | 8/1976 | Martz et al. | ............ 60/39.182 |
| 4,028,884 A | * | 6/1977 | Martz et al. | ............ 60/39.182 |
| 4,031,404 A | * | 6/1977 | Martz et al. | ............ 290/40 R |
| 4,039,846 A | * | 8/1977 | Vance | ............ 290/4 R |
| 4,164,660 A | * | 8/1979 | Palazzetti | ............ 290/2 |

(Continued)

*Primary Examiner*—Darren Schuberg
*Assistant Examiner*—Pedro J. Cuevas
(74) *Attorney, Agent, or Firm*—Pandiscio & Pandiscio; Scott R. Foster

(57) ABSTRACT

A combined heat and AC power generating system is disclosed having black start capability for the full time, simultaneous production of both electricity and heat. Heat generated within the system is captured and used for heating applications such as heating building air and tap water. The power generating system comprises an engine, generator, rectifier, variable frequency drive inverter, and inverter control electronics. The system provides improved efficiency and prolonged engine life by always operating the engine with its throttle fully open to obtain maximum efficiency and the engine is normally operated near its stall point. In this operating state the inverter control electronics adjust the power output from the inverter to control the speed of the engine. This is done by increasing the power output from the inverter when the power drawn by the load decreases. This causes the engine to operate closer to its stall point and it slows down. The power from the inverter is decreased when the power drawn by the load increases. This causes the engine to operate further from its stall point and it speeds up. The slight power changes to facilitate this operation will always be drawn from or distributed to the electric utility grid so there is no wasted power. The inverter control electronics are responsive to signals from loads such as refrigeration loads to cause the frequency of the inverter output to change to permit the refrigeration load to operate more efficiently.

19 Claims, 3 Drawing Sheets

U.S. PATENT DOCUMENTS

| | | | |
|---|---|---|---|
| 4,221,982 A * | 9/1980 | Raver et al. .................. 310/59 |
| 4,226,214 A * | 10/1980 | Palazzetti ...................... 123/2 |
| 4,240,581 A * | 12/1980 | Fowler ...................... 237/12.1 |
| 4,275,311 A * | 6/1981 | Agazzone et al. ............. 290/2 |
| 4,464,593 A * | 8/1984 | Kofink ........................ 310/58 |
| 4,503,337 A * | 3/1985 | H/a/ fner et al. ........... 290/4 D |
| 4,510,756 A * | 4/1985 | Hise et al. .................... 60/659 |
| 4,739,204 A * | 4/1988 | Kitamura et al. ......... 310/68 D |
| 4,752,697 A * | 6/1988 | Lyons et al. ................... 290/2 |
| 4,818,906 A * | 4/1989 | Kitamura et al. ............. 310/58 |
| 4,870,307 A * | 9/1989 | Kitamura et al. ............. 310/54 |
| 4,922,148 A * | 5/1990 | Kitamura .................. 310/68 D |
| 4,980,588 A * | 12/1990 | Ogawa ..................... 310/68 D |
| 5,003,788 A * | 4/1991 | Fischer ...................... 62/238.7 |
| 5,422,518 A * | 6/1995 | Sashida ........................ 307/75 |
| 5,432,710 A * | 7/1995 | Ishimaru et al. ............. 705/412 |
| 5,536,976 A * | 7/1996 | Churchill ..................... 307/11 |
| 5,646,510 A * | 7/1997 | Kumar ........................ 322/16 |
| 5,836,270 A * | 11/1998 | Aoki et al. ............... 123/41.31 |
| 5,907,238 A * | 5/1999 | Owerko et al. ............. 323/349 |
| 6,160,332 A * | 12/2000 | Tsuruhara .................... 310/54 |
| 6,169,344 B1 * | 1/2001 | Tsuruhara .................... 310/58 |
| 6,218,747 B1 * | 4/2001 | Tsuruhara .................... 310/54 |
| 6,274,941 B1 * | 8/2001 | Ryhiner .................... 290/40 A |
| 6,290,142 B1 * | 9/2001 | Togawa et al. ............. 237/12.1 |
| 6,305,170 B1 * | 10/2001 | Kitani et al. ................... 60/614 |
| 6,324,849 B1 * | 12/2001 | Togawa et al. ................ 60/616 |
| 6,367,260 B1 * | 4/2002 | Kasai et al. ................... 60/648 |
| 6,435,420 B1 * | 8/2002 | Kasai et al. ................. 237/12.1 |
| 6,612,112 B2 * | 9/2003 | Gilbreth et al. ............... 60/773 |
| 6,639,328 B2 * | 10/2003 | Wacknov ..................... 290/52 |
| 6,657,332 B2 * | 12/2003 | Balas ........................... 310/58 |
| 6,700,236 B2 * | 3/2004 | Umeda et al. ................ 310/54 |
| 6,748,742 B2 * | 6/2004 | Rouse et al. .................. 60/611 |
| 6,751,941 B2 * | 6/2004 | Edelman et al. ......... 60/39.281 |
| 6,787,933 B2 * | 9/2004 | Claude et al. ................ 290/52 |
| 6,801,019 B2 | 10/2004 | Haydock et al. ............... 322/17 |
| 6,807,074 B2 | 10/2004 | Ollila et al. ................... 363/41 |
| 6,812,587 B2 * | 11/2004 | Gilbreth et al. ............... 290/52 |
| 6,815,934 B2 * | 11/2004 | Colley .......................... 322/47 |
| 6,832,488 B2 | 12/2004 | Yokozeki et al. ............. 62/175 |
| 6,838,781 B2 * | 1/2005 | van de Loo ............. 290/40 B |
| 6,844,700 B2 | 1/2005 | Sakai et al. .................. 318/801 |
| 6,845,020 B2 | 1/2005 | Deng et al. ................... 363/37 |
| 6,847,129 B2 * | 1/2005 | McKelvey et al. ........... 290/52 |
| 6,913,068 B2 * | 7/2005 | Togawa et al. ................ 165/51 |
| 6,966,185 B2 * | 11/2005 | Shimada et al. .............. 60/698 |
| 7,040,544 B2 * | 5/2006 | Guyer ....................... 237/12.1 |
| 7,064,454 B2 * | 6/2006 | Fukaya et al. .............. 290/1 A |
| 7,127,896 B2 * | 10/2006 | Shimada et al. .............. 60/698 |
| 7,145,258 B2 * | 12/2006 | Kang et al. ..................... 290/2 |
| 7,170,191 B2 * | 1/2007 | Kang et al. ..................... 290/2 |
| 7,181,919 B2 * | 2/2007 | Uno et al. .................... 62/157 |
| 2001/0048290 A1 * | 12/2001 | Underwood et al. .......... 322/20 |
| 2002/0030365 A1 * | 3/2002 | Underwood et al. ...... 290/40 B |
| 2002/0153127 A1 * | 10/2002 | Togawa et al. ................ 165/51 |
| 2003/0209909 A1 * | 11/2003 | Fukaya et al. ............ 290/40 A |
| 2004/0000820 A1 * | 1/2004 | Cromas et al. ................ 310/52 |
| 2004/0045594 A1 * | 3/2004 | Hightower .................. 136/205 |
| 2004/0080164 A1 * | 4/2004 | McKelvey et al. ........... 290/52 |
| 2004/0124638 A1 * | 7/2004 | van de Loo ............. 290/40 C |
| 2005/0023909 A1 * | 2/2005 | Cromas et al. ................ 310/58 |
| 2005/0206167 A1 * | 9/2005 | Gehret, Jr. ..................... 290/2 |
| 2006/0037742 A1 * | 2/2006 | Kim et al. .................. 165/201 |
| 2006/0207262 A1 * | 9/2006 | Firey ............................ 60/784 |
| 2006/0288720 A1 * | 12/2006 | Jmaev ......................... 62/236 |
| 2007/0028611 A1 * | 2/2007 | Johnston et al. .............. 60/520 |
| 2007/0044481 A1 * | 3/2007 | Rabovitser et al. ........... 60/784 |

\* cited by examiner

ENGINE DRIVEN POWER INVERTER SYSTEM WITH COGENERATION

CROSS-REFERENCE TO RELATED APPLICATIONS

This application claims the benefit of the following U.S. Provisional Patent Applications.
Ser. No. 60/554,026, filed Mar. 17, 2004 in the name of Joseph B. Gehret.
Ser. No. 60/554,031, filed Mar. 16, 2004 in the name of Joseph B. Gehret.
Ser. No. 60/554,063, filed Mar. 16, 2004 in the name of Joseph B. Gehret.
Ser. No. 60/553,737, filed Mar. 17, 2004 in the name of Joseph B. Gehret.
Ser. No. 60/553,810, filed Mar. 17, 2004 in the name of Joseph B. Gehret.

FIELD OF THE INVENTION

This invention generally relates to the field of electric power generation, and more particularly to an engine driven generator and inverter apparatus for generating power in which the engine speed is controlled to accommodate different power loads drawn from the system and heat generated by the system is captured and used.

BACKGROUND OF THE INVENTION

In the prior art, electrical power generation systems comprising a motor, generator, rectifier and inverter are well known. Some such systems are Combined Heat and Power ("CHP") systems used for the simultaneous production of both electricity and heat on a continuous basis. CHP systems are also known as Cogeneration or Distributed Generation systems. In a standard, non-CHP power plant, the heat generated is rejected to the atmosphere. This is not only wasteful, but also detrimental to the environment both in terms of thermal pollution and because the thermal energy which could have been used would have to be generated via other means, generally causing additional pollution. In a CHP system, the heat generated is captured and used, leading to high overall fuel utilization as well as reduced damage to the environment.

Generally, it is advantageous to install a CHP system near the point of use of the heat generated since thermal energy, unlike electrical energy, is difficult to transport. This argues for small CHP systems which can be placed in the immediate vicinity of any variety of small commercial or institutional heat loads.

At present, CHP installations in the sub-megawatt size are dominated by power generation systems utilizing natural-gas reciprocating engines. Their popularity is not due to any singular factor, but rather due to their overall value when all factors are weighed. The factors are operating efficiency, first-cost, attainable exhaust emissions, service infrastructure, durability, heat recovery, etc. Newer technologies such as fuel cells and turbines are making important inroads into the field and show promise, but progress is slow due to various issues involving the "front-end" of these systems. Neither fuel cells nor micro-turbines with re-generators are currently affordable or practical alternatives to engine generators for CHP applications. Both fuel cells and micro-turbines have unacceptably high initial cost and must be heavily subsidized by their manufacturers or by others in order to gain initial entry to the marketplace. Engine generators, especially those driven by automotive-derivative engines, by contrast, achieve low cost, even in small quantities, because they benefit from the enormous economies of scale derived from mass production of such engines.

Manufacturers typically utilize one of two generator design options with regard to engine driven, AC generator CHP systems. The first is a "synchronous" type generator, the conventional alternator technology that is used worldwide for standby and prime-power applications. The second choice is the "induction" type generator which is more or less an induction motor pushed above its synchronous rpm to export electric energy to a live utility bus. Although both generator types are well-established reliable technologies, neither is entirely satisfactory in CHP system applications for the reasons described below.

The principle advantages of a synchronous generator are standalone capability (i.e., ability to power the facility during a blackout) and non-reliance on the utility for magnetizing current or reactive power. Standalone or "black start" operation is increasingly demanded by customers, given recent security concerns for the central power grid and also the well-publicized blackouts in the US and in Europe. Regarding the reactive power issue, while it does not impact system efficiency per se, except in line losses, the positive attributes of the synchronous machine are a definite plus. However, and despite these advantages, the synchronous generator is almost never applied to small CHP systems because of the following problems which make small, synchronous packages impractical.

1. Extreme resistance by electrical power utilities to grant interconnection approval without expensive safety relay systems. Power utility engineers fear a CHP system may unintentionally electrify a portion of the grid during a power outage. This is a hazard for the utility equipment and its workers. Some power utility engineers require two completely redundant safety systems commensurate with substation design practice to protect against this hazard. This is an impossible economic burden for a small CHP system.

2. In its most common application, a small synchronous generator is used as a standby power source. The controls in these applications are simple and reliable. When used in CHP applications, on the other hand, the control system complexity changes dramatically. The CHP system must be set up to operate both parallel to the utility grid or on a standalone basis. The parallel operation involves a complex arrangement of synchronizers, reactive power controls, dual-gain governors (one for each mode of operation) and safeties to avoid dangers to linemen caused by inadvertent islanding (continued operation of the generator while connected to an isolated section of the utility grid), plus safeties to avoid synchronizing errors. However, the most general case will involve multiple CHP systems operating parallel, per a modular design philosophy, in which case the control system design becomes even more complex and factors such as lead/lag, load sharing, and reactive power sharing must be considered. This is also an impossible economic burden for a small CHP system.

As a consequence of the above described problems with synchronous generators, the small reciprocating engine CHP system market is dominated by induction-based generators. Induction generators require no paralleling equipment and modular units can be installed in multiples with no inter-unit control requirement—a truly modular design on the electrical interface side. However, despite these advantages, induction generators have the following problems 1. The inherent safety and simplicity of induction generators results in their being inoperable during a power outage.

2. Induction generators require a substantial amount of reactive power which must be obtained from the power utility grid and some utility companies penalize customers in their rate structure for power factor when a CHP system is present.

3. There is an increasing resistance by electrical power utility companies to approve CHP system interconnect applications and there are no standards committees working toward this end. It is possible that existing CHP systems will be decertified.

Thus, there is a need for a new type of CHP system that solves the above described public utility interface and other problems of prior art CHP systems.

SUMMARY OF THE INVENTION

The above described interface and other problems in the prior art are solved by the present invention. The invention is a novel Combined Heat and Power (CHP) system with black start capability for the full time, simultaneous production of both electricity and heat for applications in the emergency/prime power market including schools, hospitals, colleges, elder-care facilities, commercial laundries, hotels, and health clubs. Very simply, the novel CHP power system comprises an engine, generator, rectifier, inverter and inverter control electronics.

Similar to prior art inverter equipped CHP systems, the novel inverter utilized with the novel CHP system described herein permits different frequencies to be output from the generator as the engine driving the generator operates at different speeds and still produce a desired voltage and frequency at the output of the inverter to load.

To obtain electrical utility interconnection quickly and with minimal cost, novel inverter control electronics are utilized that function with an engine driven, inverter based CHP system. The novel inverter control electronics provide high reliability, high efficiency, compact size, and low cost. The novel inverter control electronics also provide: (a) improved part-load efficiency, (b) the ability to operate the drive engine at lower speeds during reduced load periods, (c) the ability to operate at higher engine speeds for increased peak output, (d) simplified controls for paralleling multiple units, (e) reduced noise levels at part-load, (f) the ability to be coupled to higher non-linear loads and to start larger motors than a simple synchronous generator while running in standby, and (g) the ability to cut the CHP system connection to the utility power grid to which it is connected when the grid is dead.

The alternating current (AC) output from the engine driven generator is input to a rectifier to be converted to direct current (DC). The DC output from the rectifier is input to the inverter to be converted back to AC of a specified frequency and magnitude. In this manner, the output from the inverter is independent from the frequency of the output from the generator. This frequency independence feature is particularly useful when a permanent magnet (PM) alternator is driven by an internal combustion engine. Conventionally, the higher frequency output from PM alternators makes them virtually unworkable with all engines. When coupled with an inverter system, the frequency of PM alternators is inconsequential and the inverter electronics can be designed to benefit from the higher frequency output from the alternators. In addition, the engine driving the PM alternator can be run at whatever speed is optimum for any desired power output level.

When the power drawn from the inverter by a load is to be at different frequencies, a Variable Frequency Drive (VFD) inverter is utilized in the CHP system. VFD inverters are commonly used to drive chillers, air-conditioning compressors, and pumps, and the output frequency from the VFD is changed to run such devices at higher efficiency at partial loads. Such a load device will send a signal to the VFD inverter to instruct it to run at a specified frequency to maximize the devices's efficiency.

While the output of the novel CHP system is connected to the electric utility grid the novel inverter control electronics controls the speed of the engine to maximize the efficiency of the unit by allowing the engine to always run at an optimum speed based on the load. Because a CHP system must operate continuously, reducing engine speed for reduced loads will prolong engine life by allowing operation at reduced speeds, and thereby reducing engine wear relative to a fixed speed generator running at equivalent power. The objective is to run the engine with the throttle fully open to obtain maximum efficiency.

In accordance with the teaching of the invention, the novel inverter control electronics operate to keep the engine in a near-stall condition with the engine throttle fully open. The position or setting of the throttle of the engine is never changed and remains fully open. A sensor senses the speed of the engine and another sensor senses the amount of power being drawn from the inverter. Both of these sensors are connected to the inverter control electronics. A stored program being run by a microprocessor in the inverter control electronics processes the signals and generates another signal which is used to control the inverter to adjust the speed of the engine-generator set. Briefly, the inverter is controlled by the signal generated by the microprocessor to deliberately modify the amount of power drawn from the engine-generator combination in order to change the speed of the engine which always remains at full throttle. Because the novel CHP system is tied directly to both a load and the electric grid in this mode of operation, the slight power changes required to facilitate this novel control algorithm will always be drawn from or distributed to the electric utility grid.

If a reduced amount of power is being drawn by a load or loads connected to the inverter, this is sensed by the power draw sensor and the signal generated by the inverter control electronics will momentarily increase the power draw from the engine generator set. The additional power drawn is forwarded to the utility grid so it is not wasted. The additional power draw is sufficient to put the engine in a near stall condition, thereby reducing its rotational speed. During the course of engine deceleration, the inverter gradually lessens the amount of additional power being drawn by the inverter and being forwarded to the utility grid. When the desired reduced engine speed is approached, the inverter further reduces the amount of additional power drawn and, when the engine speed begins to level off at the desired lower level, the inverter begins to level the power draw, reaching a new, lower engine speed equilibrium point that compensates for the decreased power being drawn from the inverter to the load.

Conversely, when the power draw sensor senses an increased power draw from the inverter the signal generated by the inverter control electronics responsive to the signal from the power draw sensor causes the inverter to reduce the power drawn from the engine generator set and forwarded to the utility grid and thereby allows the engine speed to increase from its former lower speed equilibrium point. During the course of engine acceleration, the inverter gradually increases the amount of additional power being drawn by the inverter. When the desired engine speed is approached, the inverter further increases the amount of additional power drawn. When the engine speed begins to level off at the desired higher level, the inverter control will begin to level the power draw, reaching a new, higher engine speed equilibrium point that compensates for the increased power being drawn from the inverter to the load.

Another way of stating this algorithm is that the throttle is driven fully open while the inverter electronic control system maintains the alternator's power output to maintain a specific speed. This speed set point would then be adjusted slowly to achieve a specific power output level. The lower the power output level the lower the engine and generator speed, and the higher the power output level the higher the engine and generator speed.

The novel CHP system is usually the prime source of power for a load connected to it. However, if the power to be drawn by a load is expected to exceed the power that can be provided by the engine-generator set, the utility grid power may also be input to the rectifier and be converted to DC to be input to the inverter to drive the load. The microprocessor in the inverter control electronics makes this determination upon analyzing the signals it receives from the engine speed sensor and the power draw sensor. When additional power is required from the utility, power grid solid-state switches associated with the rectifier are activated to connect the utility grid to the rectifier. When the power demand by the load connected to the inverter decreases, the switches may be deactivated by the inverter control electronics so that all power supplied to the load is derived from the engine-generator set. For example, during startup of an electric motor in any kind of system, the power demand is very high. During this time, the inverter needs to draw extra power from the utility grid, and the microprocessor in the inverter control electronics causes the utility power grid to be connected to the input of the rectifier. In addition, if the motor or generator fails, all power for the load connected to the inverter may be drawn from the utility grid. This is a seamless changeover from the generator to the utility power grid.

DC power from other sources such as solo photovoltaic cells may also be input to the inverter to be converted to AC power of a specified frequency.

BRIEF DESCRIPTION OF THE DRAWINGS

The invention will be better understood upon reading the following Description of the preferred Embodiment in conjunction with the drawings in which.

DESCRIPTION OF THE PREFERRED EMBODIMENT

Figure 1:
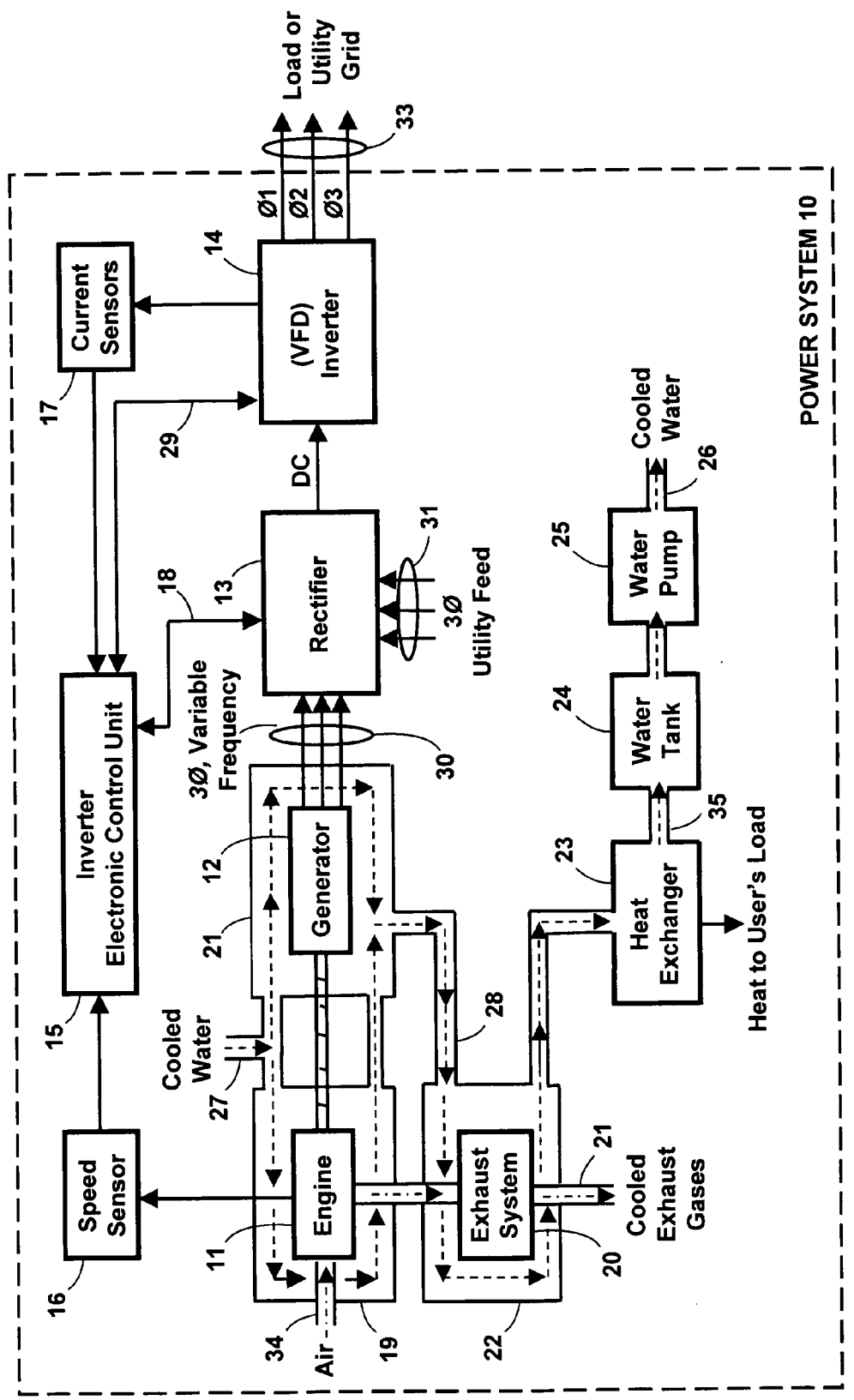
FIG. 1 is a block diagram of one form of the novel power system.

The invention comprises a novel Combined Heat and Power ("CHP") electrical power generating system utilizing novel inverter control electronics for the simultaneous production of both electricity and heat. As described in the Summary of the Invention, there are numerous advantages provided by the novel inverter control electronics as utilized with the novel engine driven CHP system. Generally, those advantages are high reliability, high efficiency, compact size, and low cost. More specifically, the above listed advantages are: (a) improved part-load efficiency, (b) the ability to operate the drive engine at lower speeds during reduced load periods, (c) the ability to operate at higher engine speeds for increased peak output, (d) simplified controls for paralleling multiple units, (e) reduced noise levels at part-load, (f) the ability to be coupled to higher non-linear loads and to start larger motors than a simple synchronous generator while running in standby, and (g) the ability to cut the CHP system connection to the utility power grid to which the novel CHP system is connected when the grid is dead. Some of these advantages are expanded upon in the following paragraphs.

The higher partial load efficiency has the secondary benefit of reducing fuel consumption and combustion chamber temperatures, and therefore lowering nitrous oxide (NOx) emission concentrations in a catalytic converter of the engine exhaust system. Efficient partial load performance is very desirable in CHP systems to permit economical operation during reduced load periods. Rather than shutting down at light loads, variable speed CHP generators can continue to provide both electricity, and to produce heat at high overall thermal efficiencies.

When the novel inverter is used, the engine can be pushed for short periods at higher speeds and therefore generate a proportionally higher power output. A 30% increase in output is reasonable based on experience with variable speed compressor products (i.e. chillers).

The novel inverter system has a limited ability to produce short circuit overload current, unlike prior art generators.

A concern held by the electrical power utilities is the ability of a CHP system to create an "island" when a portion of their grid is isolated with the CHP system and a load. Their fear is that their line workers will assume that this islanded section of their grid is dead, but with the CHP system continuing to run, there will be an electrocution hazard. This can occur because CHP systems typically operate continuously. The novel inverter has anti-islanding operation with the ability to cut the CHP system connection to the utility grid when it is dead.

The difficult and complex array of controls required in the prior art for conventional synchronous generators to protect power utility line workers working on dead grids are eliminated when the novel inverter is used. In principle, with the novel inverter system, it will be possible to forego the complex and costly prior art controls, even in multiple CHP system sites, replacing them with a network link between program controlled microprocessors in the novel inverter control electronics.

Induction generators draw reactive power from the utility power grid, even while generating power. The net result is higher currents and the resultant over-sizing of transmission and distribution equipment. This in turn often leads utilities to penalize customers with high reactive power draws (low power factors). The novel CHP system with the novel inverter control electronics will not draw reactive power and will therefore have uncompromised transmission and distribution benefits when grid paralleled, avoiding any reactive power surcharges by the power utility company.

In FIG. 1 is shown a block diagram of the novel power system 10. The basic elements of the power system are an internal combustion engine 11 that typically runs on natural gas, but may be run on other fuels. To avoid cluttering FIG. 1, a fuel input to engine 11 is not shown. Such engines 11 are well known in the art, so it is not described in further detail herein. Engine 11 is physically connected to and drives a generator 12 to produce a three-phase output, as represented by the three leads 30.

Air is provided to engine 11 to combust fuel as the engine is running. Air filters, known in the art but not shown in FIG. 1, may be used to clean the air before it is input to engine 11. Exhaust gases from engine 11 pass through an exhaust system 20 which typically comprises a catalytic converter, exhaust gas heat exchanger, and muffler, which perform in a manner well known in the art. Exhaust gases exit exhaust system 20 at pipe 20a.

Generator 12 is preferably a permanent magnet (PM) alternator having amorphous metal stators that offer extremely high efficiency and a compact package. In a conventional topology the high frequency output from PM generator 12 makes it unworkable with virtually all rotary devices, but when coupled with an inverter system its frequency is inconsequential and the inverter electronics can be designed to benefit from a higher frequency input. Engine 11 is run at different speeds dependent upon the load connected to leads 33 in order to provide the greatest operating efficiencies. This is described in greater detail further in this detailed description. Accordingly, the frequency of the three-phase output from PM generator 12 varies on output leads 30 from generator 12. Further in this description engine 11 and generator 12 or often referred to as engine-generator set 11,12.

The three-phase AC voltage of variable frequency output from PM generator 12 is input to rectifier 13 via leads 32. Rectifiers for converting relatively large amounts of AC power to DC power are well known in the art so rectifier 13 is not described in greater detail. The rectified and filtered DC power output from rectifier 13 is input to inverter 14.

Optionally, there is a second input to rectifier 13 comprising three-phase AC on three leads 31 from a utility feed. When engine-generator set 11,12 is inoperable to provide AC power to rectifier 13 the utility power on leads 31 is instead rectified by rectifier 13 and input to inverter 14. On occasions when engine-generator set 11,12 cannot provide peak power to a load connected to leads 33, power is also drawn from the utility feed on leads 31 to supplement the power being generated by the engine-generator set 11,12.

Inverter 14 inverts the DC power at its input back to three-phase AC (Ø1,Ø2,Ø3) on its output leads 33. In FIG. 1 inverter 14 is designated "(VFD) Inverter". It is marked this way because in some applications a Variable Frequency Drive (VFD) inverter is needed and in other applications a VFD inverter is not needed. A VFD inverter is capable of being controlled by external means to provide output power at different frequencies. There are certain types of loads such as air-conditioning compressors and pumps that run more efficiently at partial loads when the frequency of their input power is changed. VFD inverters are best for such applications. A signal is sent from the air-conditioning compressors, pumps etc. to an inverter electronic control unit 15 to change the frequency of the output from VFD inverter 14. The VFD inverter 14 is optimized particularly for use in a CHP system.

To control the operation of (VFD) inverter 14, the inverter electronic control unit 15 is provided. Control unit 15 comprises a microprocessor operating under the instructions of a stored program. The operation of the microprocessor per the stored program is described in greater detail with reference to FIGS. 2A and 2B. There is a speed sensor 16 that senses the operating speed (rpm) of engine 11 and there are current sensors 17 that sense the amount of power (kilowatts) that the inverter is providing to a load connected to its output leads 33. Control unit 15 also senses power being output from generator 12 to rectifier 13, the presence of utility feed power on leads 31, and can control the connection of the utility feed power on leads 31 to rectifier 13. These functions are all accomplished via leads 18.

If control unit 15 senses that engine 11 is not running or there is no power being output from generator 12 while the engine is running, it sends a signal via leads 18 to operate solid-state switches (not shown) in rectifier 13 to connect the utility feed on leads 31 to rectifier 13. As required, control unit 15 may also operate the last mentioned solid-state switches to connect the utility feed on leads 31 to rectifier 13 at the same time that generator 12 is inputting AC power via leads 30 to rectifier 13. This latter operation is performed when the load connected to leads 33 is drawing more power than engine-generator set 11,12 alone can provide.

In accordance with the teaching of the invention, the novel inverter electronic control unit 15 controls the inverter 14 to keep engine 11 in a near-stall condition with the engine throttle (not shown) fully open. The position or setting of the throttle of engine 11 is never changed and remains fully open during operation. Speed sensor 16 senses the speed of engine 11, and sensors 17 sense the amount of power being drawn from inverter 14. All these sensors are connected to the inverter electronic control unit 15 and the information provided by the sensors is used by the stored program being run in the microprocessor to control the operation of inverter 14 in accordance with the teaching of the invention. More particularly, the stored program being run by the microprocessor in inverter electronic control unit 15 processes the sensor signals and generates another signal which is sent to inverter 14 over lead 29 to control inverter 14 to adjust the speed of the engine-generator set 11, 12. Briefly, inverter 14 is controlled by the microprocessor generated control signal on lead 29 to deliberately modify the amount of power drawn from engine-generator set 11, 12 in order to change the speed of engine 11 which always remains at full throttle. Additional power drawn by inverter 14 for this purpose is input to the utility grid so as not to be wasted.

To aid to aid in understanding the last sentence in the previous paragraph and the description in the following paragraphs the following example is presented. A CHP power system 10 is used to supply power to a building. The power generated by system 10 is kept at a level to keep engine 11 in a near-stall condition with the engine throttle fully open. All electric apparatus in the building normally consume or draw a total of 200 kilowatts of power. Power supply 10 provides 100 kilowatts of the power consumed and utility power grid is used to provide 100 kilowatts of the power consumed. When the electrical apparatus in the building are drawing less than 100 kilowatts of power from power supply 10 engine 11 is slowed down to more efficiently generate electrical power. To slow engine 11 down inverter electronic control unit 15 causes the output from inverter 14 to be increased placing an increased load on engine 11. The result is that engine 11 slows down since it is already operating in a near stall condition. The excess power output from inverter 14 onto leads 33 is returned to the utility power grid, so it is not wasted.

In more detail, if a reduced amount of power is being drawn by the load or loads connected to inverter 14 via leads 33, this is sensed by the current sensors 17 and the signal generated by inverter electronic control unit 15 on lead 29 will momentarily cause an increase in the power drawn from engine-generator set 11,12 and output from inverter 14. The additional power drawn is forwarded to the utility grid so it is not wasted. The additional power draw is sufficient to put engine 11 in a near stall condition, thereby reducing its rotational speed. During the course of engine deceleration, the control signal sent via lead 29 causes inverter 14 to gradually lessen the amount of additional power being output from inverter 14 and forwarded to the utility grid. When the desired reduced engine speed is approached, the control signal on lead 29 causes inverter 14 to further reduce the amount of additional power output from inverter 14 and, when the engine speed begins to level off at a desired lower level, inverter 14 will begin to level its power output, reaching a new, lower engine speed equilibrium point that compensates for the decreased power being drawn by the inverter.

Conversely, when current sensors 17 sense an increased power draw from inverter 14 by the load or loads, the control signal on lead 29, generated by the inverter electronic unit 15, will momentarily cause inverter 14 to reduce the power drawn from engine-generator set 11, 12 and output from inverter 14 to the utility grid, and thereby allow the engine speed to increase from its former lower speed equilibrium point. During the course of engine acceleration, the control signal on lead 29 causes inverter 14 to gradually increase the amount of additional power being output from inverter 14. When the desired increased engine speed is approached, the control signal on lead 29 causes inverter 14 to further increase the amount of additional power being output. When the engine speed begins to level off at the desired higher level, the control signal on lead 29 will level the power output, reaching a new, higher engine speed equilibrium point that compensates for the increased power being output from inverter 14 to the load.

Combined Heat and Power ("CHP") systems are used for the simultaneous production of both electricity and heat on a continuous basis. CHP systems are also known as Cogeneration or Distributed Generation systems. In a non-CHP power plant, the heat generated by the engine and other system components is rejected to the atmosphere. This is not only wasteful, but also detrimental to the environment both in terms of thermal pollution and because the thermal energy which could have been saved and used would have to be generated via other means, generally causing additional pollution. In the CHP system of the present invention the heat generated is captured and used, leading to high overall fuel utilization as well as reduced damage to the environment.

Heat is captured in the CHP power system 10 in the following manner. As shown in FIG. 1, engine 11 has a water jacket 19 around it, generator 12 has a water jacket 21 around it, and exhaust system 20 has a water jacket 22 around it. Cooled water is input to water jackets 19 and 21 at input 27. The cooled water is input under pressure and flows through water jackets 19 and 21 around engine 11 and generator 12. The water is partially heated by drawing heat from engine 11 and generator 12. The partially heated water then flows through pipe 28 and to water jacket 22 around exhaust system 20. The water is further heated by the heat of the exhaust gases passing through exhaust system 20.

The heated water exiting water jacket 22 flows into heat exchanger 23 where the heat is withdrawn and taken to a user's load. An example would be to pass building air over heat exchanger 23 to heat the air and circulate it through a building. Tap water may also be heated. During this heat change process the heated water is cooled and flows into a water tank 24. A water pump 25 then pumps the cooled water from tank 24 via pipe 26 to input pipe 27 back into water jackets 19 and 21. In this manner the amount of heat exhausted into the atmosphere and wasted is minimized.

Figure 2:
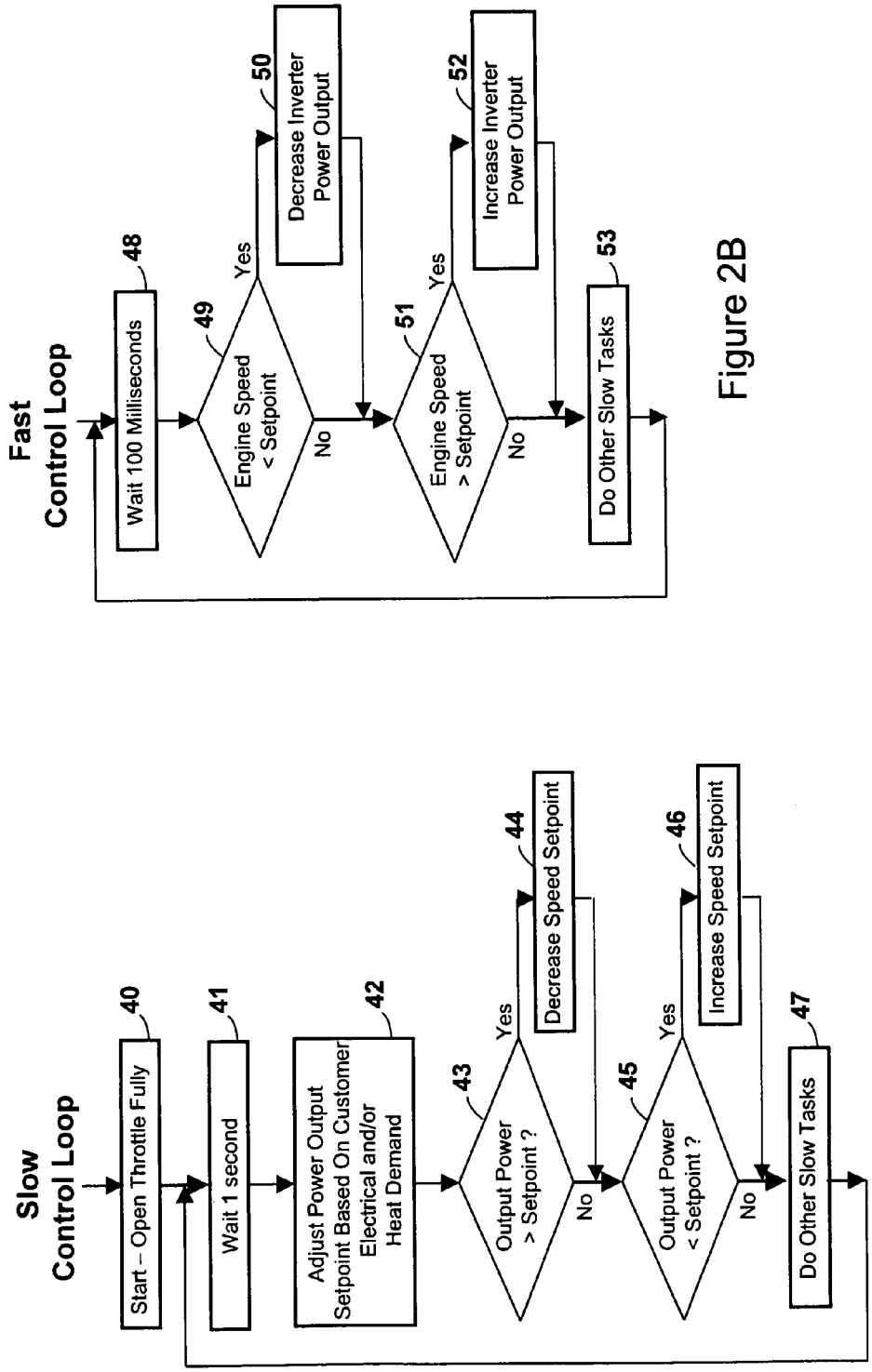
FIG. 2A is a flow chart of the steps performed by a microprocessor in an inverter electronic control unit under control of a stored program for a slow control loop to control an inverter to cause an engine of a CHP power system to speed up or slow down to compensate for different power loads drawn from the CHP power system.
FIG. 2B is a flowchart of steps performed by the microprocessor in an inverter electronic control unit under control of a stored program for a fast control loop to control an inverter to cause the engine of the CHP power system to speed up or slow down to compensate for different power loads drawn from the CHP power system.

In FIG. 2A is shown a flowchart of the steps performed by a microprocessor in inverter electronic control unit 15 under control of a stored program for a slow control loop to control inverter 14 to cause engine 11 of CHP power system 10 to speed up or slowdown to compensate for different power loads drawn from CHP power system 10.

In the slow control loop, at block 40 engine 11 of CHP power system 10 is started with its throttle fully open and the throttle will remain fully open while power system 10 is in operation. At block 41 the program waits for one second before progressing to block 42 and this sets the cycle time for the slow control loop. During the one second delay the microprocessor in inverter electronic control unit 15 reads the output of speed sensor 16 to know the speed of engine 11, and reads current sensors 17 to know the amount of power being drawn by the customer on leads 33. At block 42 the microprocessor utilizes the information from the sensors and adjusts the engine speed set point based on the customers present electrical and/or heat demand. If the output on leads 33 or the thermal output is above the desired value, the engine speed setpoint is increased. Conversely, if the output on leads 33 or thermal output is below the desired value, the engine speed setpoint is decreased. The engine set points indicate the most efficient operating speed of engine 11 for different power levels drawn from power system 10 by the customer.

To adjust the power output from engine 11 the program progresses to decision block 43 where the program decides whether or not the output power from engine 11 at the speed it is running is greater than that which is necessary to efficiently generate the electrical power being drawn by the customer. Stated another way, engine 11 is operating at a set point speed greater than is necessary to efficiently deliver the power being drawn by the customer on leads 33. If the decision is no, the program progresses to block 45. If the decision is yes, the program progresses to block 44 where a lower engine speed set point is selected based on the amount of power being drawn by the customer to decrease the speed of engine 11, as described with reference to FIG. 2B, so it operates more efficiently while delivering the power being drawn by the customer.

Either way, the program then progresses to decision block 45 where the program then decides whether or not the output power from engine 11 at the speed it is running is less than that which is necessary to efficiently generate the electrical power being drawn by the customer. Stated another way, engine 11 is operating at a set point speed lower than is necessary to efficiently deliver the power being drawn by the customer on lead 33. If the decision is no, the program progresses to block 47. If the decision is yes, the program progresses to block 46 where a higher engine speed set point is selected, based on the amount of power being drawn by the customer, to increase the speed of engine 11 as described with reference to FIG. 2B to operate more efficiently while delivering the power being drawn by the customer. After a new engine speed set point is selected at block 46 the program progresses to block 47 where other slower tests are performed. The slower tests include, but are not limited to reading and checking engine coolant temperature and pressure, reading and checking oil temperature, and reading and checking other engine and generator sensors.

After the slower tests are performed at block 47, the program cycles back to block 41 to repeat the operations performed in block 41 through 47. Due to the one second delay accomplished in block 41, the evaluation of the proper engine speed set point is accomplished once every second.

The engine speed set point that is finally selected to efficiently provide power being drawn by the customer over leads 33 is used to generate a signal over lead 29 to inverter 14 to change the power output from inverter 14 and thereby either speed engine 111 up or slow engine 11 down as previously described. This is better described with reference to FIG. 2B.

In FIG. 2B is shown a flowchart of the steps performed by the microprocessor in inverter electronic control unit 14 under control of the stored program for a fast control loop to control inverter 14 to cause engine 11 of power system 10 to speed up or slowdown per the setpoint determined in FIG. 2A, and compensate for different power loads drawn from the power system. In the fast control loop, at block 48, the program waits one-hundred milliseconds so the cycle time of the fast control loop is one-hundred milliseconds. The speed of engine 11 is therefore adjusted every one-hundred milliseconds.

After one-hundred milliseconds the program progresses to decision block 49 where it is determined whether or not the engine speed measured by speed sensor 16 is less than the engine speed set point determined in the slow control loop in FIG. 2A. When the decision is no, the program progresses to decision block 51. When the decision is yes, the program progresses to block 50.

At block 50 the power output from inverter 14 is decreased. This is accomplished by a signal output from inverter electronic control unit 15 on leads 29 to inverter 14. It must be remembered that the power being drawn from inverter 14 at output leads 33 comprises a combination of power being drawn by the load and power being returned to the utility grid to keep engine 11 operating at a near-stall condition. The decrease in the power output from inverter 14 therefore causes the speed of engine 11 to increase to be equal to the engine speed set point. The program then progresses to decision block 51.

At decision block 51, it is determined whether or not the speed of engine 11, measured by speed sensor 16, is greater than the engine speed set point determined in the slow control loop in FIG. 2A. When the decision is no, the program progresses to block 53. When the decision is yes, the program progresses to block 52.

At block 52 the power output from inverter 14 is increased. This is accomplished by a signal output from inverter electronic control unit 15 on leads 29 to inverter 14. Again, it must be remembered that the power being drawn from inverter 14 at output leads 33 comprises a combination of power being drawn by the load and power being returned to the utility grid to keep engine 11 operating at a near-stall condition. The increase in the power output from inverter 14 therefore causes the speed of engine 11 to decrease to be equal to the engine speed set point. The program then progresses to decision block 53 where other faster tasks are performed. The faster tasks may include, but are not limited to, checking the output voltage and frequency change requests from chillers and other refrigeration equipment.

After the slower tasks are performed at block 47, the program cycles back to block 48 to repeat the operations performed in block 48 through 53. Due to the one-hundred millisecond delay accomplished in block 41, the engine speed is adjusted every one-hundred milliseconds.

Figure 3:
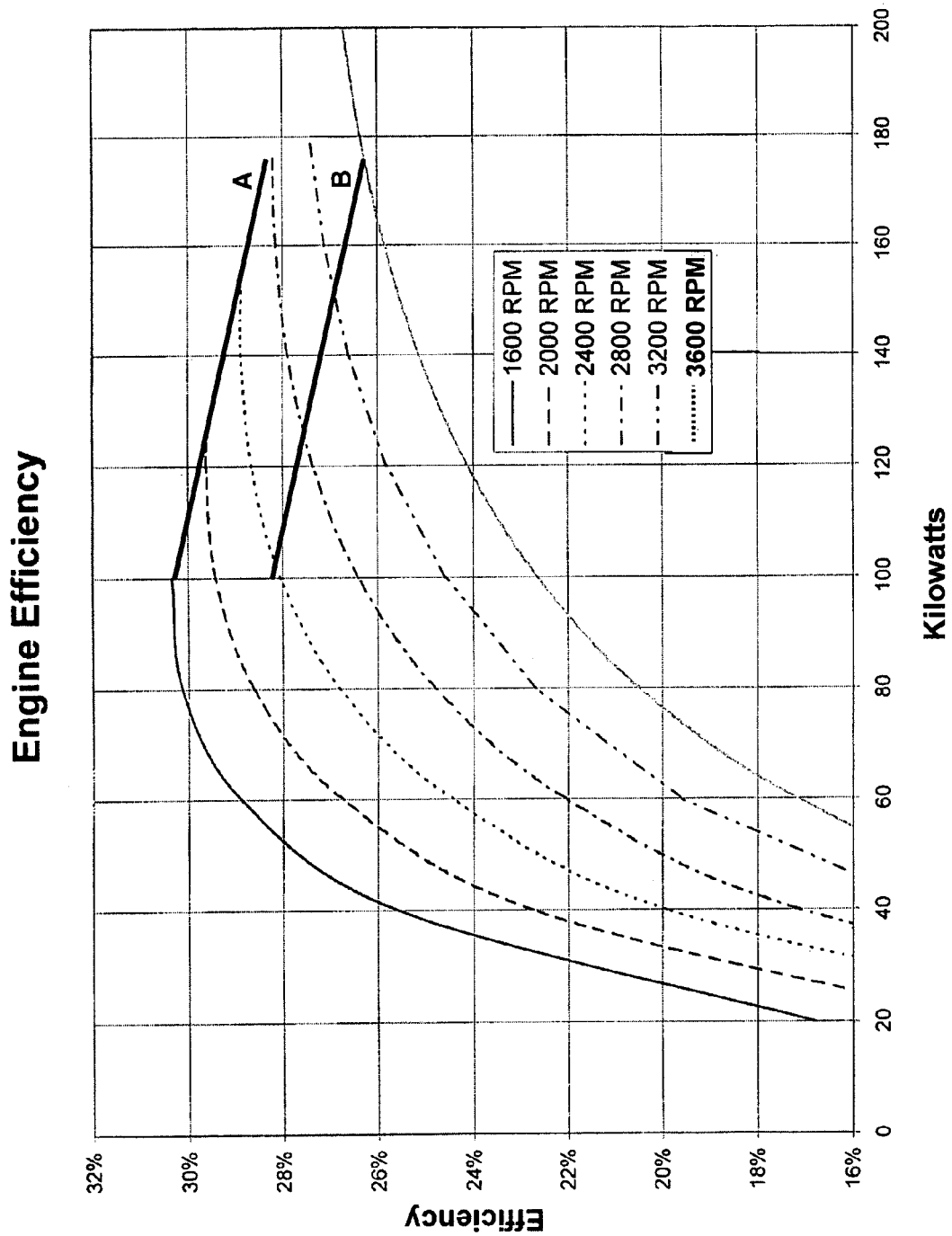
FIG. 3 is a chart showing the efficiency of the engine of the CHP power system as a function of the kilowatts of power being delivered by the generator of the CHP power system.

FIG. 3 is a chart showing the efficiency of engine 11 of CHP power system 10 as a function of the kilowatts of electrical power being delivered by power system 10. These efficiencies are typical for internal combustion engines running at different speeds. There are six curves traced on the graph in FIG. 4. The six curves are plots for engine 11 at six speeds ranging from 1600 rpm to 3600 rpm. It should be noted that for each given power output from engine 11, the slower the speed of the engine the greater is the efficiency of the engine. Thus, it is advantageous to always run engine 11 at the slowest possible speed to drive generator 12 to get the desired power output from CHP power system 10 on leads 33. That is the goal of the novel engine speed control, accomplished using inverter electronic control unit 15 to control the amount of power output from inverter 14. It should also be noted that if CHP power system 10 is to supply 100 kilowatts of power, engine 11 can be run at any speed above 1600 rpm to meet this power output. However, the faster engine 11 runs, the lower will be its efficiency and the higher the resultant fuel consumption. Thus, it is advantageous to run engine 11 at the slowest possible speed to meet the power demands on system 10.

In the prior art, predetermined engine maps are used and, to have some margin for error, the engine will be operated along line B in FIG. 3. With the present invention, with the engine running at wide open throttle, and speed being controlled by always operating the engine at a near-stall condition, the engine will be operated along line A in FIG. 4. This results in an efficiency increase of 2%, corresponding to a reduction in fuel consumption of 7% for kilowatt power levels equivalent to the prior art.

While what has been described herein is a preferred embodiment of the invention, it will be understood by those skilled in the art that numerous changes may be made without departing from the spirit and scope of the invention.

The invention claimed is:

1. A combined heat and AC power generating system, the combined heat and AC power generating system comprising:
    an internal combustion engine mechanically coupled to a rotating shaft;
    an exhaust system for removing combustion gases from said enginel;
    a permanent magnet alternator having a rotor mechanically coupled to the shaft and generating AC power;
    rectifying means for converting the AC power from said alternator to DC power;
    inverter means for converting the DC power from said rectifying means to AC power having a defined amplitude and a frequency different than the AC power output from said alternator;
    a water jacket around said internal combustion engine;
    a water jacket around said exhaust system;
    a heat exchanger;
    means for passing water through said water jacket around said internal combustion engine and said water jacket around said exhaust system to remove heat from said internal combustion engine and said exhaust system, the removed heat being utilized for purposes including heating building air and heating tap water;

a first sensor for sensing the speed of said engine and providing a first signal;

a second sensor for sensing the amount of power being output from said inverter means and providing a second signal; and an electronic control unit responsive to the first and second signals for generating a control signal to said inverter for controlling the amount of power being output from said inverter means and thereby controlling the speed of said internal combustion engine.

2. The combined heat and AC power generating system of claim 1 further comprising a water jacket around said alternator and said means for passing water forces water through said alternator water jacket.

3. The combined heat and AC power generating system of claim 2 further comprising a water tank for holding water after it has passed through said heat exchanger.

4. The combined heat and AC power generating system of claim 3 wherein said means for passing water comprises a water pump for pumping water from said water tank to the water jackets of the engine, alternator and exhaust system.

5. The combined heat and AC power generating system of claim 1
wherein said engine is always run at its highest efficiency, normally near its stall point, with its throttle fully open, and (a) as the power consumed by the load decreases, this is sensed by said second sensor and the control signal generated by said electronic control unit causes said inverter to output more power which is not wasted but which increases the load on said engine and thereby slows said engine down to operate at a more efficient speed to provide the decreased amount of power consumed by the load, or (b) as the power consumed by the load increases, this is sensed by said second sensor and the control signal generated by said electronic control unit causes said inverter to output less power which is not wasted but which decreases the load on said engine and thereby speeds said engine up to operate in a more efficient speed to provide the increased power consumed by the load.

6. The control apparatus of claim 4 wherein the load uses AC power from both a utility power grid and from said inverter and when said inverter is caused to output more power to slow said engine down, the excess power output from said inverter means is returned to the utility power grid and is not wasted.

7. The combined heat and AC power generating system of claim 1 wherein said inverter means is a variable frequency drive inverter means for converting the DC power from said rectifying means to output AC power for a load, the output power from the variable frequency drive inverter means has an amplitude and different frequencies as required by the load when the load requires different amounts of power at different frequencies to make the load operate more efficiently, and further comprising:

a first sensor for sensing the speed of said engine and providing a first signal;

a second sensor for sensing the operating point of said inverter means and providing a second signal; and an electronic control unit responsive to the first and second signals for generating a control signal to said inverter means for controlling the amplitude and frequency of the power being output from said inverter means to the load.

8. The combined heat and AC power generating system of claim 6 wherein said inverter means is a variable frequency drive inverter means for converting the DC power from said rectifying means to output AC power for a load, and the output power from said variable inverter means has an amplitude and different frequencies as required by the load to operate more efficiently.

9. Control apparatus for an AC power generating system that has an internal combustion engine, an alternator connected to and driven by the engine to generate AC power, rectifying means for converting AC power from the alternator to DC power, a controllable inverter means for converting the DC power from the rectifying means to output AC power to a load having a defined amplitude and a frequency different than the AC power from the alternator, the control apparatus comprising:

a first sensor for sensing the speed of the engine and providing a first signal;

a second sensor for sensing the amount of power being output from the inverter means and providing a second signal;

an electronic control unit responsive to the first and second signals for generating a control signal to the inverter means for controlling the amount of power being output from the inverter means and thereby controlling the speed of the engine;

wherein the engine is always run at its highest efficiency, normally near its stall point, with its throttle fully open, and (a) as the power consumed by the load decreases this is sensed by said second sensor and the control signal generated by the electronic control unit causes the inverter to output more power which is not wasted but which increases the load on the engine and thereby slows the engine down to operate at a more efficient speed to provide the decreased amount of power consumed by the load, or (b) as the power consumed by the load increases, this is sensed by said second sensor and the control signal generated by the electronic control unit causes the inverter to output less power which is not wasted but which decreases the load on the engine and thereby speeds the engine up to operate in a more efficient speed to provide the increased power consumed by the load.

10. The control apparatus of claim 9 wherein the alternator is a permanent magnet alternator having amorphous metal stators and the AC power output from the alternator is at a frequency that is different than the frequency of the AC power output from the alternator to the load.

11. The control apparatus of claim 10 wherein the closer the engine is driven to its stall point the slower the engine will run, and the further the engine is driven from its stall point the faster the engine will run.

12. The control apparatus of claim 11 wherein the load uses AC power from both the utility power grid and from the inverter and when the inverter means is caused to output more power to slow the engine down the excess power output from the inverter means is returned to the utility power grid and is not wasted.

13. The control apparatus of claim 9 wherein the controller is used with a combined heat and AC power generating system, the engine has an exhaust system, and the heat generated by the engine, its exhaust system and the alternator is captured and is utilized for many purposes including heating building air and heating tap water.

14. The control apparatus of claim 13 wherein the inverter means is a variable frequency drive inverter used to output power having an amplitude and different frequencies as required by the load when the load requires different amounts of power at different frequencies to make the load operate more efficiently.

15. The control apparatus of claim 9 wherein the inverter means is a variable frequency drive inverter used to output power having an amplitude and different frequencies as required by the load when the load requires different amounts of power at different frequencies to make the load operate more efficiently.

16. An AC power generating system for providing AC power at different amplitudes and different frequencies to a load, the generating system comprising:
an internal combustion engine;
an alternator connected to and driven by said engine for providing AC power;
rectifying means for converting AC power from said alternator to DC power;
a variable frequency drive inverter means for converting the DC power from said rectifying means to output AC power for a load, the output power from said inverter means having an amplitude and different frequencies as required by the load to operate more efficiently;
a first sensor for sensing the speed of said engine and providing a first signal;
a second sensor for sensing the operating point of said inverter means and providing a second signal; and
an electronic control unit responsive to the first and second signals for generating a control signal to said inverter means for controlling the amplitude and frequency of the power being output from said inverter means to the load wherein said engine is always run at its highest efficiency, normally near its stall point, with its throttle fully open, and (a) as the power consumed by the load decreases this is sensed by said second sensor and the control signal generated by said electronic control unit causes said inverter means to output more power which is not wasted but which increases the load on said engine and thereby slows said engine down to operate at a more efficient speed to provide the decreased amount of power consumed by the load, or (b) as the power consumed by the load increases this is sensed by said second sensor and the control signal generated by said electronic control unit causes said inverter means to output less power which is not wasted but which decreases the load on said engine and thereby speeds said engine up to operate in a more efficient speed to provide the increased power consumed by the load.

17. The AC power generating system for providing AC power at different amplitudes and different frequencies to a load in accordance with claim 16, wherein the AC power generating system is a combined heat and AC power generating system, said internal combustion engine has an exhaust system, and the heat generated by said engine, its exhaust system and the alternator is captured and is utilized for many purposes including heating building air and heating tap water.

18. The AC power generating system for providing AC power at different amplitudes and different frequencies to a load in accordance with claim 17, wherein the load uses AC power from both the utility power grid and from said inverter means, and when the inverter means is caused to output more power to slow said engine down, the excess power output from said inverter means is returned to the utility power grid and is not wasted.

19. The AC power generating system for providing AC power at different amplitudes and different frequencies to a load in accordance with claim 16, wherein the heat generated by said engine, its exhaust system and said alternator is captured by heating water flowing over portions of said engine, its exhaust system and said alternator.

* * * * *

UNITED STATES PATENT AND TRADEMARK OFFICE
CERTIFICATE OF CORRECTION

| | | |
|---|---|---|
| PATENT NO. | : 7,239,034 B2 | Page 1 of 1 |
| APPLICATION NO. | : 11/078191 | |
| DATED | : July 3, 2007 | |
| INVENTOR(S) | : Joseph B. Gehret, Jr. | |

It is certified that error appears in the above-identified patent and that said Letters Patent is hereby corrected as shown below:

Column 8, line 53, delete "to aid" (second occurrence);

Column 11, line 17, change "engine 111" to -- engine 11 --; and

Column 12, claim 1, line 50, change "engine1" to -- engine --.

Signed and Sealed this

Ninth Day of October, 2007

JON W. DUDAS
*Director of the United States Patent and Trademark Office*